(No Model.)
W. C. ALFORD.
ANIMAL YOKE.
No. 432,503. Patented July 22, 1890.
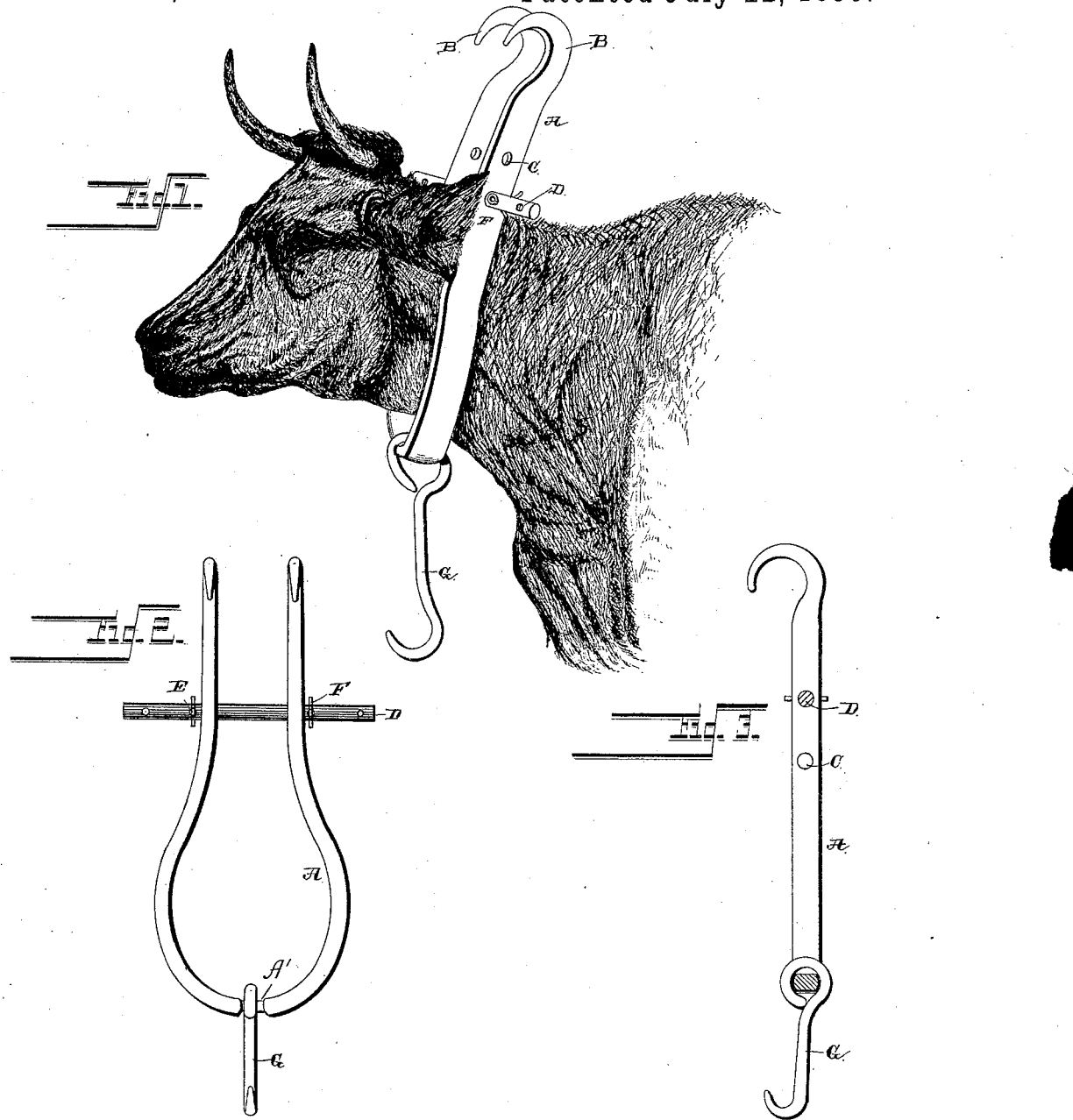
Witnesses
Horace G. Seitz
R. H. Bishop
Inventor
William C. Alford.
By his Attorneys
C. A. Snow & Co.

UNITED STATES PATENT OFFICE.

WILLIAM C. ALFORD, OF HAZELTON, KANSAS.

ANIMAL-YOKE.

SPECIFICATION forming part of Letters Patent No. 432,503, dated July 22, 1890.

Application filed November 20, 1889. Serial No. 330,940. (No model.)

*To all whom it may concern:*

Be it known that I, WILLIAM C. ALFORD, a citizen of the United States, residing at Hazelton, in the county of Barber and State of Kansas, have invented a new and useful Animal-Yoke, of which the following is a specification.

My invention is an improved yoke to prevent animals passing through wire fences; and it consists in certain novel features hereinafter described and claimed.

In the accompanying drawings, Figure 1 is a perspective view showing my improved device in its operative position. Fig. 2 is a side view of the same. Fig. 3 is a vertical section.

In carrying out my invention I employ a yoke A, which is composed of a metallic bar bent into the U-shaped form shown in the drawings, and adapted to fit over the neck of the animal. The ends of this bar project above the neck of the animal and are bent forward, as shown at B, so as to provide hooks adapted to engage over the fence-wires when the animal moves against the same, and to slip readily from the same when the animal moves backward. The opposite sides of the yoke are provided with a series of transverse openings C, those of one side aligning with those of the other, through which the transverse connecting-bar D is passed. This bar D is provided at its ends with transverse openings, through which spring split pins E F are passed, the said pins being adapted to bear against the sides of the yoke, and thereby lock the same on the animal's head. At the lower end of the yoke I provide the depending hook G, which is hung loosely on the yoke by means of an eye G', in which the hook terminates at its upper end, and which encircles the reduced portion A' of said yoke, and is adapted to engage the lower fence-wire when the animal moves against the fence, as will be readily understood. By reason of the opposite shoulders formed by the reduced portion A' of the yoke the hook is maintained against any material side movement or play, whereby it is always in position to accomplish its functions. Furthermore, the hook is curved at its lower end, and when brought in contact with the ground will readily glance off, permitting the animal to lower its head, as in the act of feeding, without any liability of remaining in a vertical line with its point of pivot with the yoke.

In practice the yoke is fitted over the neck of the animal, as illustrated in Fig. 1, and is fastened thereon by inserting the locking-bar D through the proper perforations in the yoke and then passing the spring pins or keys through the proper openings in the ends of the locking-bar. The device will thus be effectually secured in position, and will engage the fence-wires if the animal should move against the same. The animal will thus be prevented from passing through and breaking down the fence, and the necessity for frequent repairs to the fence obviated.

It will be observed that my device is extremely simple in its construction, and that it can be manufactured at a slight cost and easily applied to the animal. The inner side of the yoke is convex, so that it will not chafe the animal's neck, and the device can be easily adjusted so as to fit the neck of any animal by reason of the perforations in the yoke and the locking-bar.

Having thus described my invention, what I claim, and desire to secure by Letters Patent, is—

The herein-described animal-yoke of U shape, the terminals of which are bent to form forwardly-disposed hooks, and below said hooks provided with a series of opposite aligning perforations, the perforated transverse locking-bar D, passed through a pair of the perforations and locking-pins passed through the perforations in the bar at each side of the yoke, and the loosely-suspended hook G, mounted in the lower end of the yoke, substantially as specified.

In testimony that I claim the foregoing as my own I have hereto affixed my signature in presence of two witnesses.

WILLIAM C. ALFORD.

Witnesses:
T. FOX,
B. J. GARD.